Dec. 3, 1963  E. L. ETNYRE  3,112,809
INDEPENDENT REAR WHEEL SUSPENSION
Filed July 21, 1961

INVENTOR.
Edwin L. Etnyre
BY
W. F. Wegner
ATTORNEY

United States Patent Office
3,112,809
Patented Dec. 3, 1963

1

3,112,809
INDEPENDENT REAR WHEEL SUSPENSION
Edwin L. Etnyre, Warren, Mich., assignor to General Motors Corporation, Detroit, Mich., a corporation of Delaware
Filed July 21, 1961, Ser. No. 125,759
6 Claims. (Cl. 180—73)

This invention relates to vehicle suspension and more particularly to swing axle suspension for the driving wheels of a vehicle.

An object of the invention is to provide an improved vehicle suspension.

Another object is to provide an improved swing axle suspension.

A further object is to provide a swing axle suspension utilizing a cantilever leaf spring as both the elastic medium and one element of the linkage operating to control the wheel deflection path.

A still further object is to provide a swing axle suspension of the type wherein each rear wheel is operatively connected to the vehicle differential by means of a live half axle, the opposite ends of which are articulatably connected respectively to the wheel and to the differential, the wheel being guided through a predetermined path of angular deflection by means of guiding links pivotally connected to a wheel supporting member and to the sprung mass of the vehicle in such a way as to provide a minimum camber change within the full range of deflection of the wheel.

A yet further object is to provide a suspension arrangement of the stated character wherein the wheel supporting member is formed and arranged with reference to the links so as to permit ready adjustability of the wheel camber angle.

A still further object is to provide a suspension of the type described including link means enabling toe-in adjustment to obtain the desired rear wheel steer characteristics.

These and other objects, advantages and features of the invention will become more fully apparent as reference is had to the accompanying specification and drawing wherein.

Figure 1:
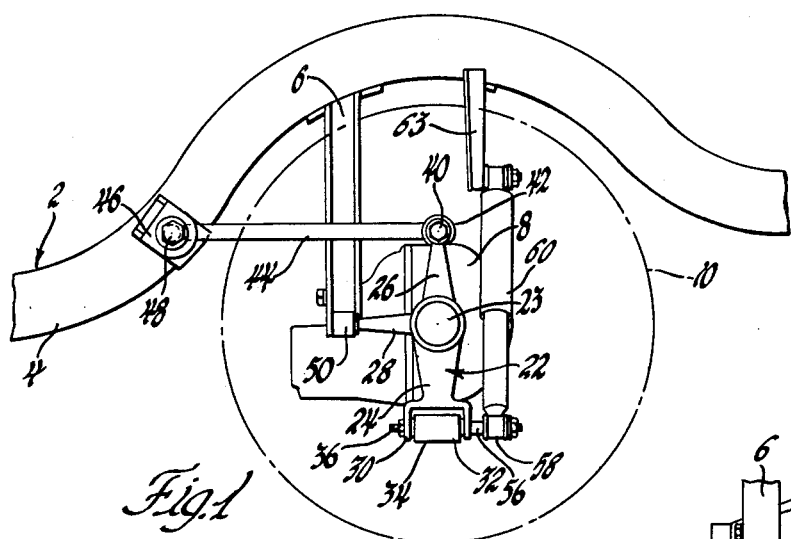
FIG. 1 is a partial side elevational view of a vehicle chassis incorporating suspension structure in accordance with the invention.

Referring now to the drawings and particularly FIG. 1, reference numeral 2 designates generally a vehicle frame or superstructure which includes a longitudinally extending side rail 4 and a transversely extending frame cross member 6 which extends between side rail 4 and a second side rail, not shown, at the opposite side of the vehicle parallel with rail 4. Suspended transversely midway between the two frame side rails and supported in part on cross frame member 6 is a conventional differential drive mechanism 8 through which power from the vehicle engine, not shown, is transmitted to the vehicle wheel 10 via live axle 12. While the suspension structure and arrangement of the present invention is shown only with respect to the left rear wheel 10, it will be understood that corresponding identical structure is employed with respect to the right rear wheel, not shown. Therefore, it will be understood that the following description with respect to the left rear wheel suspension applies equally to that of the right rear wheel.

Figure 2A:
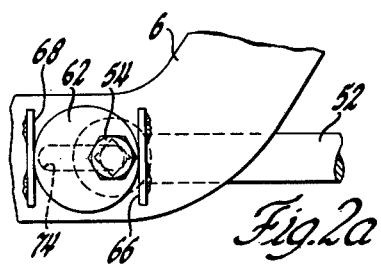
FIG. 2a is an enlarged fragmentary view looking in the direction of arrows 2a—2a of FIG. 2.
Figure 2:
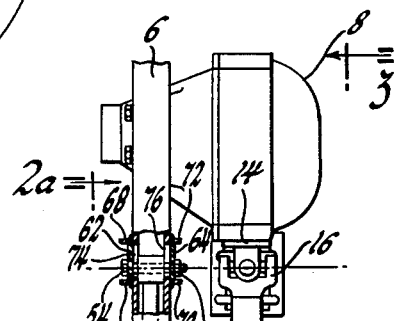
FIG. 2 is a fragmentary plan view, partly in section, of the arrangement shown in FIG. 1.

As seen best in FIG. 2, differential structure 8 includes a transversely extending output member 14 which is connected to the inboard end of live axle 12 by means of a Cardan type universal joint 16. Similarly, the outboard end of axle 12 is connected by a second universal joint 18 to a stub shaft 20 connected to wheel 10. Stub shaft 20 is rotatably mounted and axially contained in a wheel supporting member 22, shortly to be described. Since wheel 10 is not rigidly connected to the outboard end of half axle 12, it is not required to move in a path normal to the angular inclination of the axle. Accordingly, wheel supporting and guiding structure is provided which produces optimum wheel geometry rather than requiring the wheel to conform to a deflection path dictated by the angular inclination of the half axle 12, as is the case in a conventional single universal joint swing axle suspension.

In accordance with the present invention, the wheel supporting structure 22 upon which wheel 10 and stub shaft 20 are rotatably mounted takes the form of a forging having a central transversely extending hub portion 23 from which three integral branches 24, 26, and 28 extend in a common vertical longitudinal plane. Branch 24 extends downwardly from hub 23 and is formed with a bifurcated lower end 30 which straddles the eye 32 of the main leaf of a cantilever leaf spring assembly 34. A pivot shaft 36 extends through lower end 30 and eye 32 to secure the latter to the former. The inner end of spring assembly 34 in turn is rigidly secured to an outrigger mounting boss 38 formed on differential 8. Branch 26 of forging 22 extends upwardly from hub portion 23 and is pivotally connected on a transversely extending axis by a bolt 40 to the rearward end 42 of a horizontal longitudinally extending link 44, the forward end of which is pivotally connected on a transversely extending axis to a bracket 46 on side rail 4 by means of a bolt 48. Branch 28 of forging 22 extends forwardly from hub portion 23 and is pivotally connected on a longitudinally extending axis to the outer end 50 of a horizontal transversely extending link 52, the inboard end of which is pivoted to cross frame member 6 by a bolt 54. Bolt 54 includes a pair of longitudinally spaced washers 62 and 64 which are keyed to the bolt eccentric to the axis thereof. Washers 62 and 64 engage the side walls of cross member 6 between parallel vertically extending ears 66, 68 and 70, 72, respectively. Transversely elongated slots 74 and 76 formed in the side walls of cross member 6 permit the bolt 54 and inboard end of link 52 to move laterally responsive to rotation of washers 62 and 64 between the respective ears 66, 68 and 70, 72. After attaining the desired location, determined in a manner shortly to be described, bolt 54 is secured against rotation and translation by tightening nut 78. As seen best in FIG. 2, pivot shaft 36 also includes a short rearwardly extending stud 56 which engages the lower end 58 of a telescoping hydraulic shock absorber 60, the upper end of which is pivotally mounted on a depending bracket 63 formed on side rail 4.

In suspension construction according to the invention, lateral forces on the wheel 10 are resisted by the live axle 12 and cantilever leaf spring 34. Naturally, such forces impose axial loads on both universal joints 16 and 18. However, it has been found that such universal joints are capable of absorbing loads well in excess of those encountered under normal conditions. Braking and acceleration forces are absorbed exclusively by link 44 and spring 34. The effectiveness of link 44 and spring 34 in resisting both acceleration and braking torque is, of course, significantly enhanced by the vertical distance between the upper and lower extremities of branches 26 and 24. While the wheel 10 would normally possess little stability with respect to the vertical axis extending between the spring eye 32 and the pivotal connection 40, rotation about this axis is prevented by link 52 and branch 28.

In addition to performing the function just described, link 52, by virtue of the adjustability of the inboard pivot 54 thereof, also allows establishment of a normal load toe-in angle for wheel 10 as well as permitting any desired toe-in change pattern to be achieved. This latter aspect is of particular significance, since optimum rear wheel steer characteristics may require at one extreme a wheel toe-in angle which changes constantly as the wheel deflects from its normal position, and at the other extreme a constant toe-in angle at all positions of wheel deflection. In the embodiment shown, predetermined toe-in change pattern and normal toe-in position is accomplished by placing the axis of bolt 54 in the proper relation to the geometric center of universal joint 16. By way of example, when other geometric factors in the suspension design require a constant toe-in angle regardless of wheel deflection position, the axis of bolt 54 will lie co-linear with the center of universal joint 16. Naturally, the initial or normal toe-in angle for the condition described is determined by the overall length of link 52. Conversely, where a change in toe-in angle is required for optimum rear wheel steer, the axis of the bolt is displaced either laterally outwardly or laterally inwardly from the position shown depending upon the toe-in pattern change desired. Still a further variation in the range of control of toe-in pattern may be accomplished by orienting the cam adjusting means for bolt 54 so that the latter is translated vertically rather than laterally upon rotation of the bolt, whereby the axis of bolt 54 may lie either co-linear with universal joint 16 or vertically above or below.

Figure 3:
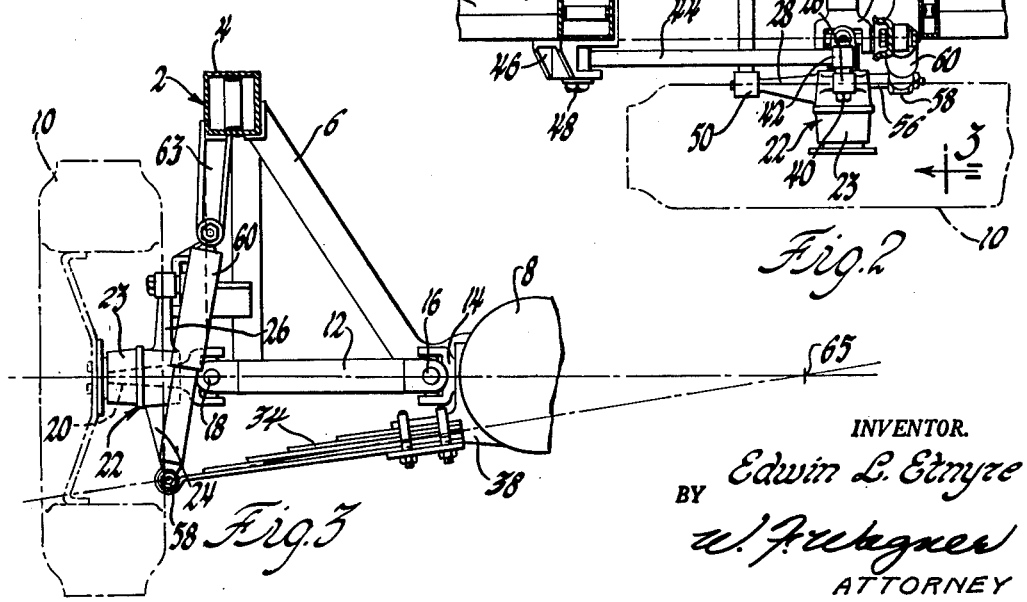
FIG. 3 is a fragmentary rear end elevational view looking in the direction of arrows 3—3 in FIG. 2.

According to another feature of the invention, the initial camber angle of wheel 10 may be adjusted by shifting the axis of pivot shaft 36 inwardly and outwardly by appropriate rotation. In this connection, it will also be seen by reference to FIG. 3 that the initial inclination of spring 34 and axle 12 in end elevation is such that a very long effective radius of swing is obtained which is defined by the intersection point 65 of the axis of axle 12 and the transverse plane of spring 34. Hence, very moderate camber change occurs as the wheel travels vertically between full compression and full rebound.

While but one embodiment of the invention has been shown and described, it will be apparent that other changes and modifications may be made therein. It is, therefore, to be understood that it is not intended to limit the invention to the embodiment shown, but only by the scope of the claims which follow.

I claim:
1. In a vehicle having a frame mounted differential, independent wheel suspension comprising a transversely extending live axle articulatably connected at one end to said differential and at the other end to a stub axle, a wheel mounted on said stub axle, said stub axle being rotatably mounted in a wheel supporting member having three integral branches extending upwardly, downwardly, and forwardly, respectively, from a central hub portion, a longitudinal link pivotally connected at its opposite ends to said frame and the upper extremity of said upwardly extending branch, a cantilever leaf spring anchored at one end on said differential and pivotally connected at the other end to the lower extremity of said downwardly extending branch, and a transversely extending link pivotally connected at its opposite ends to said frame and the forward extremity of said forwardly extending branch.

2. In a vehicle having a differential supported on the sprung mass thereof, independent wheel suspension comprising a transversely extending live axle articulatably connected at its opposite ends to said differential and a wheel carrying stub axle, said stub axle being rotatably mounted in a wheel supporting member having three integral branches extending upwardly, downwardly, and forwardly, respectively, from a central hub portion, a longitudinally extending horizontal link pivotally connected at its opposite ends to said sprung mass and to the upper extremity of said upwardly extending branch, a transverse cantilever leaf spring anchored at one end on said differential and pivotally connected at the other end to the lower extremity of said downwardly extending branch, a transversely extending horizontal link pivotally connected at its opposite ends to said sprung mass and to the forward extremity of said forwardly extending branch, and means for varying the position of the pivotal connection at the inboard end of said last mentioned link relative to the sprung mass.

3. In a vehicle having a frame mounted differential, independent wheel suspension comprising a transversely extending live axle having a universal joint at each end connected respectively to said differential and to a stub axle having a wheel mounted thereon, said stub axle being rotatably mounted in the transverse hub portion of a wheel supporting member having three integral branches extending upwardly, downwardly, and forwardly, respectively, from said hub portion, a longitudinal link pivotally connected at its opposite ends to said frame and the upper extremity of said upwardly extending branch, a cantilever leaf spring anchored at one end on said differential and pivotally connected at the other end to the lower extremity of said downwardly extending branch, a transversely extending link pivotally connected at its opposite ends to said frame and the forward extremity of said forwardly extending branch, and a hydraulic shock absorber pivotally connected between said supporting member and said frame, the pivotal connection for the outer end of said leaf spring and the lower end of said shock absorber being co-linear.

4. The structure set forth in claim 3 wherein the pivotal connection for the inner end of said transverse link is co-linear with the geometric center of the inner universal joint of said half axle.

5. The structure set forth in claim 3 wherein the pivotal connection for the inner end of said transverse link is spaced laterally from an imaginary longitudinal axis passing through the geometric center of the inner universal joint of said half axle.

6. The structure set forth in claim 3 wherein said transverse link extends parallel to said live axle.

References Cited in the file of this patent
UNITED STATES PATENTS

| | | |
|---|---|---|
| 2,115,915 | McCain | May 3, 1938 |
| 2,157,773 | Probst | May 9, 1939 |
| 3,002,580 | Mueller et al. | Oct. 3, 1961 |